Sept. 15, 1970    E. F. TREVATHAN    3,528,617
ROTARY COMMINUTOR WITH CROWDER FEEDER
Filed Feb. 9, 1968    2 Sheets-Sheet 1

INVENTOR.
ELLIS F. TREVATHAN
BY John R. Walker, III
Attorney

Sept. 15, 1970  E. F. TREVATHAN  3,528,617
ROTARY COMMINUTOR WITH CROWDER FEEDER
Filed Feb. 9, 1968  2 Sheets-Sheet 2
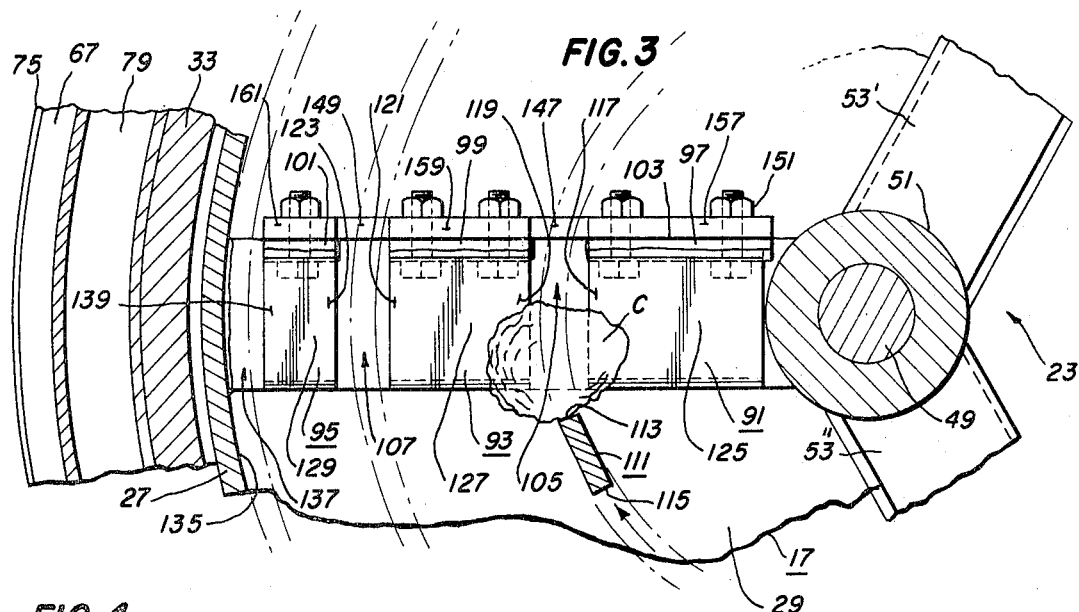
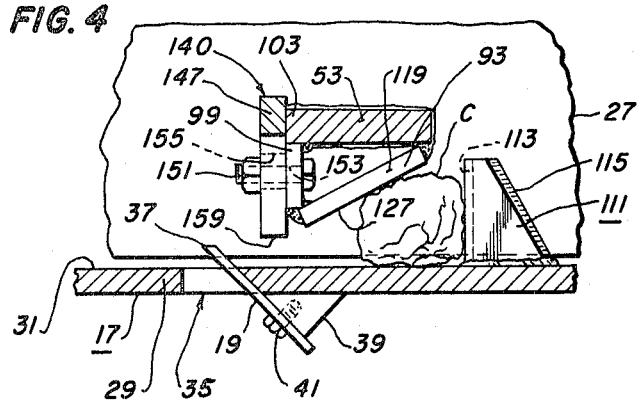
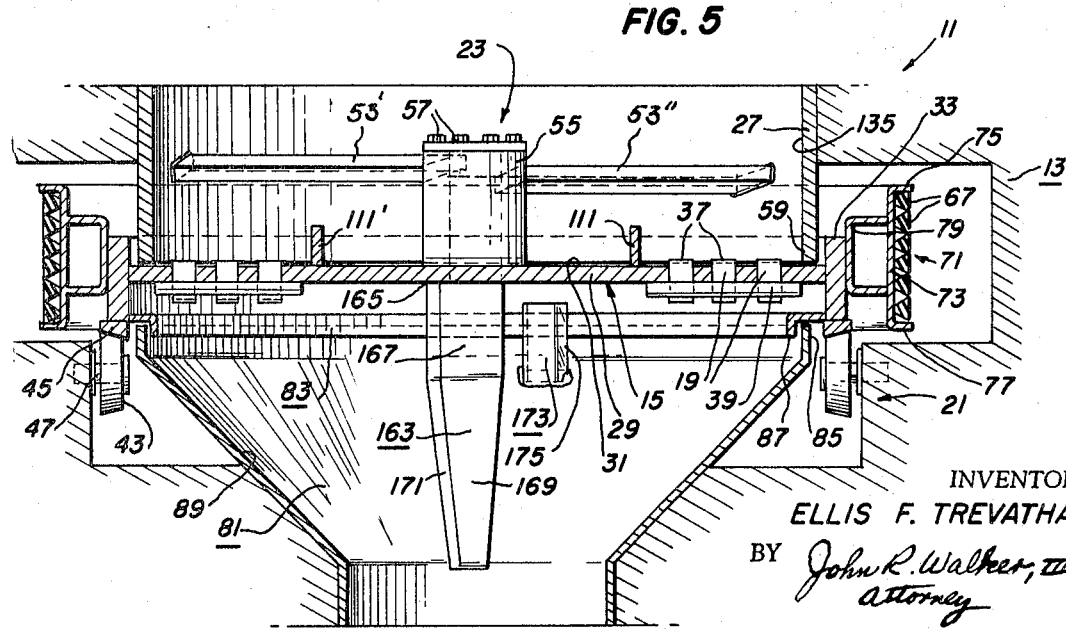
INVENTOR.
ELLIS F. TREVATHAN
BY John R. Walker, III
Attorney

United States Patent Office 3,528,617
Patented Sept. 15, 1970

3,528,617
ROTARY COMMINUTOR WITH CROWDER FEEDER
Ellis Franklin Trevathan, Gleason, Tenn. 38229
Filed Feb. 9, 1968, Ser. No. 704,469
Int. Cl. B02c *18/22, 23/00*
U.S. Cl. 241—92      10 Claims

ABSTRACT OF THE DISCLOSURE

A machine especially useful for comminuting chunks of mined clay stock and thus for preparing the clay stock for storage or for further processing. The machine includes a large-diametered knife-carrying cutter rotor mounted on a vertical axis. The running rotor being adapted to receive a charge of clay stock on the top side thereof and to cut and pass the clay stock through and below the rotor. The machine especially includes feed structure for uniformly feeding the clay stock through the machine including structure for breaking the clay material into smaller parts before it is acted on by the rotor knives and includes structure for uniformly feeding the clay material against the knife edges and through the rotor body. The feed structure of the machine also includes doffing structure arranged underneath the rotor for removing unwanted buildup of clay material from parts of the machine arranged underneath the rotor.

BACKGROUND OF THE INVENTION

Field of the invention

It relates generally to devices for disintegrating or comminuting solid material and to such devices used for breaking, chopping or grinding such material.

Description of the prior art

The general mechanical arrangement utilizing a large cutting wheel or rotor mounted on a vertical axis may be found in various arts for carrying out various actions on solid or semi-solid work material. Pats. No. 1,024,262; 2,044,563; and 2,147,852 illustrate a few of the many machine designs utilizing a cutting wheel mounted on a vertical axis. The problems of designing an effective clay-comminuting machine, however, is substantially foreign to the problems of developing a machine for handling other materials, as for instance, the refuse material handled by the machine of Pat. No. 2,044,563 or the grain material of the machine of Pat. No. 2,147,852.

Previous clay-comminuting machines included stationary means in the form of vanes, bars, spiders or the like fixed in a bowl-like chamber above the rotor for use in holding and feeding the clay through the rotor knives. Such stationary structure functioned to retard the rotation of the stock above the rotor and acted somewhat as baffle or retarding means for causing the clay stock to be sliced and passed through the rotor blades.

The moisture content in clay material varies considerably; the clay stock will range from hard and dry to substantially wet and plastic. A problem heretofore has been in developing a clay-comminuting machine suitable for handling or processing this wide range of stock material. The highly cohesive nature of the wet or damp clay material causes it to be difficult to handle and to tend to clog the knife blades. Also, in the wet or damp clay materials there was a problem of clay material buildup or deposit on various parts of the machine. Often it was necessary for the operator to stop the machine in order to clear it of such buildup deposits of clay.

A problem in handling hard clays was the difficulty in obtaining continuous or uniform feed through the knives of the rotor. Particularly when the knives were dull, the harder clays had a tendency to build up in front of the spider or other baffle structure and not to be properly fed through the knives. The harder chunks of clay stock had a tendency to form rounded corners and in such form the knives of the rotor would not properly bite or have sufficient draft on the rounded clay particle to carry it through the knives.

SUMMARY OF THE INVENTION

The machine of the present invention especially includes unique feed means for providing a uniform flow of clay material. The feed means of the present invention includes crowder and breaker means for crowding the clay material against the cutting edges of the clay working knives and also includes breaker means for breaking the chunks of harder clay material. The breaker means of the invention includes upstanding breaker lugs fixed on the upper surface of the rotor and such lugs adapted to agitate and cause the material to move through the rotor blades. The feed means of the invention also includes a stationary wiper plate adapted for use when processing the wetter clays. The wiper plate is adapted to wipe the wet clay from the cutting edges of the clay working knives and to cause the knives to act more effectively. The feed means of the invention also includes doffing means for removing deposits or buildups of clay material from various parts of the machine. Doffing means is provided underneath the rotor of the invention for cleaning clay material from various parts arranged underneath the rotor.

BRIEF DESCRIPTION OF THE DRAWING

FIG. 3 is an enlarged horizontal plane sectional view taken as on the line III—III of FIG. 1 and as viewed in an unward direction.

FIG. 4 is an enlarged vertical plane sectional view taken as on the line IV—IV of FIG. 1.

FIG. 5 is a vertical plane sectional view taken as on the line V—V of FIG. 2.

DESCRIPTION OF THE PREFERRED EMBODIMENT

Figure 1:
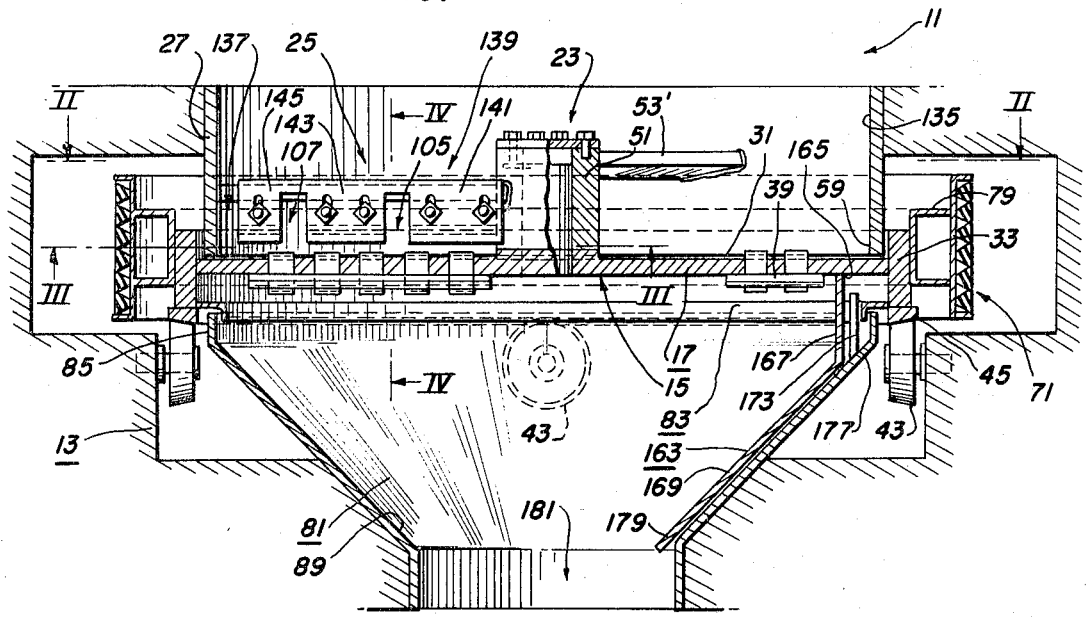
FIG. 1 is a sectional view of the machine of the present invention taken as on the line I—I of FIG. 2.

The machine of the present invention is indicated by numeral 11 and includes basic components including support structure 13 (indicated schematically); a rotor 15 including a rotor body 17 and blades 19; first and second bearing means 21, 23 supportingly journalling rotor 15 on a vertical axis and feed means indicated generally and designated by numeral 25.

Support structure 13 is the body or rigid supporting framework of the machine and may be of any construction suitable for the particular machine installation. Support structure 13 preferably includes cylindrical ring structure 27 arranged horizontally and opening vertically. Rotor body 17 includes a horizontal main portion 29 having an upwardly facing face 31 and a vertical rim portion 33 secured to and extending circumferentially about main portion 29.

Cutter blades 19 are arranged generally circularly and radially about the axis of rotor 15 and are adjustably fitted in rotor main portion 29. Each blade 19 is diagonally fitted in a through opening 35 in rotor body portion 29 with the cutting edge 37 arranged above rotor face 31. Blade mounting structure 39 including bolt fastener means 41 adjustably secure each blade 19 in rotor body portion 29 (see FIG. 4). Cutting edge 37 of each blade 19 faces the direction of motion of rotor 15 and is operably adapted to cut an underportion from a chunk or particle of clay stock supported on rotor face 31.

First bearing means 21 is preferably arranged subjacently of rotor 15 and rotatingly supports rotor 15 against gravity and against downward axial displacement. First bearing means 21 basically includes a plurality of trunnion rollers 43 and a trunnion roller track 45. The trunnion rollers (four being illustrated) are equi-angularly spaced apart and are journalled on roller shafts 47 secured on support structure 13. Trunnion roller track 45 extends circularly and is fixedly secured on the lower portion of circular rim portion 33 of roller body 17. Although not illustrated rollers 43 preferably are arranged in pairs of rollers. Preferably, four pairs of trunnion rollers are provided with each pair of rollers being in tandem arrangement and mounted on a rocker shaft.

Second bearing means 23 is preferably supported from support structure ring structure 27 and rotatingly supports rotor 15 against horizontal radial displacement. Second bearing means 23 basically includes a short axle shaft 49, a bearing casing 51 and a plurality of struts 53. Axle shaft 49 is fixedly secured centrally in rotor body 17 and projects upwardly from rotor face 31. Bearing casing 51 is sleeve-like and is snugly but turnably received over axle shaft 49. Preferably three struts 53, 53', 53" rigidly interconnect casing 51 and support structure ring 27. Each strut 53, 53', 53" extends radially and the opposite end portions are fixedly secured respectively to casing 51 and ring structure 27. A disc-like cap 55 preferably is secured by bolt fasteners 57 over the upper end of bearing casing 51. Rotor 15 is turnably supported subjacently of ring structure 27 with lower circular portion 59 of the ring structure being closely spaced above rotor face 31 and radially inwardly adjacent rotor rim portion 33.

The means for driving rotor 15 is illustrated somewhat schematically but basically includes an electric motor 61 and belt and pulley means 67, 69 and 71. Large diametered pulley srtucture 71 is secured concentrically on rotor body rim 33. Large pulley structure 71 includes a circular face part 73 (see FIG. 5) having upper and lower flanges 75, 77 and a channel-sectioned spacer part 79 extending circularly and fixedly interconnecting face part 73 and rotor body rim 33. A plurality of juxtaposedly arranged V belts 67 are passed around motor drive pulley 69 and face part 73 of pulley structure 71. Speed reduction means (not shown) preferably is interposedly arranged between drive pulley means 69 and pulley structure 71; jack shaft means, or other speed reduction means preferably is interposedly arranged between motor 61 and rotor 15 for driving the rotor at substantially slow speed (approximately 30–50 r.p.m.).

A funnel-shaped conical chute 81 is stationarily arranged subjacently of rotor 15. Chute 81 is arranged on the lower outfeed side of rotor 15 and is adapted to convergingly conduct the comminuted clay material to a conveyor belt or receptacle structure (not shown). Rotor body 17 preferably includes structure defining a spillage shield 83 arranged circumferentially over the circular upper rim 85 of chute 81. Spillage shield 83 is right angular in cross section and includes a downturned flange 87 extending circumferentially along the circular inside surface 89 of chute rim 85. Rotating spillage shield 83 prevents clay material from passing between rotor rim 33 and chute rim 85.

Preferably, three angularly disposed crowder-breaker bars 91, 93, 95 are secured subjacently and adjacent the leading edges thereof to radially extending strut 53 (see FIGS. 3 and 4). Crowder-breaker bars 91, 93, 95 are plate-like and generally rectangular and are fixedly secured in end-to-end spaced relationship along the underside of strut 53 adjacent the leading edge thereof. Three brace bars 97, 99, 101 are fixedly inerposedly secured respectively between the trailing edge portions of bars 91, 93, 95 and the trailing edge 103 of strut 53. Brace bars 97, 99, 101 are of equal transverse extensions respectively with the transverse extensions of crowder-breaker bars 91, 93, 95, that is, the brace bars are in alignment with the crowder-breaker bars and are spaced apart the same distances. Each crowder-breaker bar and brace bar assembly 91, 97; 93, 99; and 95, 101 define substantially an assembly with strut 53 which is substantially triangular in cross section (see FIG. 4). Open spaces 105, 107 are defined respectively between crowder-breaker bars 91, 93 and 93, 95, and between brace bars 97, 99 and 99, 101. Preferably, two pair of breaker lugs 109, 109' and 111, 111' (see FIG. 2) are fixedly secured on rotor body main portion 29 and project upwardly from rotor face 31. Breaker lugs 109, 109', 111, 111' each are preferably of like configuration with each having a substantially flat vertical leading edge, as edge 113 in lug 111 (see FIGS. 3 and 4) and a downwardly sloping trailing edge 115 as in lug 111. Breaker lugs 111, 111' are arranged substantially 180° apart on the face of rotor body 17 and are so positioned to pass through the space 105 between crowder-breaker bars 91, 93, and brace bars 97, 99. Breaker lugs 109, 109' in like manner are spaced diametrically apart and are so arranged to pass through space 107 between crowder bars 93, 95 and brace bars 99, 101.

Crowder-breaker bars 91, 93, 95 afford means for crowding the clay material into the cutting edges of rotor blades 19 and in conjunction with breaker lugs 109, 109', 111, 111' afford means for breaking the clay material into smaller particles. FIGS. 3 and 4 illustrate a chunk C of clay material being acted on by the clay-breaking means of the machine. As illustrated in FIGS. 3 and 4, as the rotor turns clockwise, breaker lug 111 causes clay chunks C to be wedgingly urged into space 105 between the confronting end portions of crowder-breaker bars 91, 93 and face 31 of rotor body 17. The confronting end portions respectively of crowder-breaker bars 91, 93 define respectively a pair of breaking edge portions 117, 119 respectively. As lug 111 moves through space 105 between pair of breaking edge portions 117, 119, the clay material is broken into smaller particles for better cutting action by rotor blades 19. In like manner, space 107 between crowder-breaker bars 93, 95 is defined substantially by a pair of breaker edge portions 121, 123 respectively on end portions of bars 93, 95.

The clay crowding function of crowder-breaker bars 91, 93, 95, is exhibited also without the coaction of breaker lugs 109, 109', 111, 111'. The rotative movement of rotor blades 19 under the crowder-breaker bars is adapted to propel the clay material wedgingly underneath the crowder bars and thereby forceably urge the clay material against cutting blade edges 37. The flat obliquely extending crowder surfaces 125, 127, 129 respectively of crowder-breaker bars 91, 93, 95 cause the clay material to be forced downwardly and fed past rotor blades 19 and into chute 81 underneath the rotor.

The struts 53', 53" are preferably angled in a manner similar to crowder-breaker bars 91, 93 and 95, but at different heights so that the struts 53', 53" have the same wedging function as that hereinabove described for the crowder-breaker bars for different sizes of chunks of clay material and serve as additional crowder means. In other words, strut 53', being at a higher position relative to blades 19 than the crowder-breaker bars will take care of larger chunks and strut 53", being at an intermediate position will take care of intermediate size chunks of material.

Figure 2:
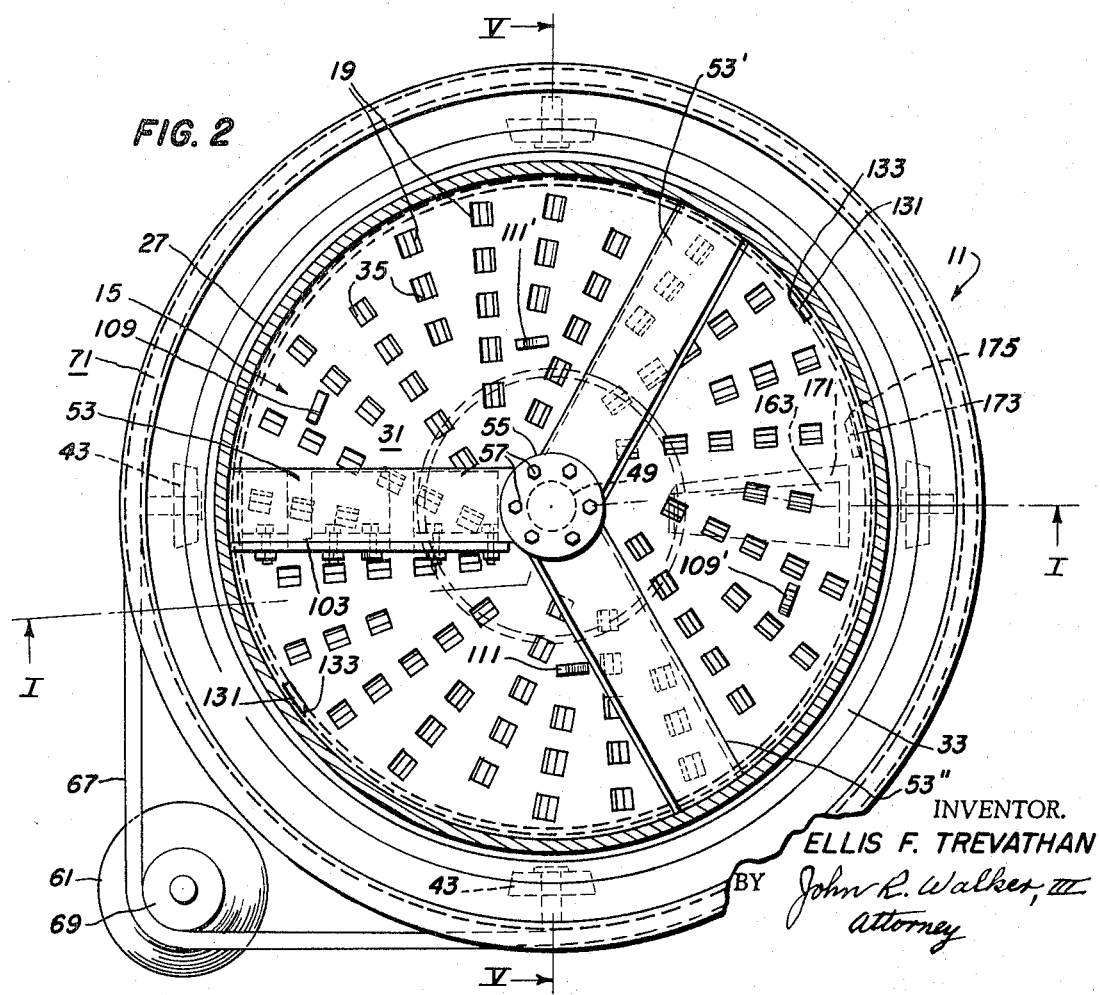
FIG. 2 is a horizontal plane sectional view taken as on the line II—II of FIG. 1.

The feed means of machine 11 also includes dual function breaker-scraper lugs 131, 131 fixedly secured on face 31 of rotor 15 (see FIG. 2). Each lug 131 is provided with a vertical inwardly tapered leading edge 133 and is arranged contiguous circular inside surface 135 of support structure ring structure 27. Upon rotation of rotor 15, breaker-scraper lugs 131, 131 are adapted to brush past stationary circular ring surface 135 and to scrape built up deposits of clay material from the ring surface. Breaker-scraper lugs 131, 131 are adapted to pass through a gap 137 defined between the outer end of breaker-scraper bar 95 and ring structure 27. The outer end portion of breaker-scraper bar 95 defines substantially a single obliquely-extending breaker edge portion 139. The breaking action of breaker-scraper lugs 131, 131 are exhibited as the lugs move around inside surface 135 of ring 27 and pass through gap 137. In addition to scraping built up material from circumferential inside surface 135 of ring structure 27, lugs 131, 131 wedgingly break the clay material into smaller parts as the lugs move through gap 137.

A comb-like wiping plate 139 is adjustably secured along trailing edge 103 of strut 53. Wiping plate 139 is adapted to be optionally used when processing wet sticky clays and its use is substantially unnecessary in processing dry hard clay material. Wiper plate 139 is arranged substantially in sections 141, 143, 145 (see FIG. 1) each corresponding respectively in longitudinal length (transverse extension) with crowder-breaker bars 91, 93, 95. Bridge portions 147, 149 (see FIG. 3) arranged respectively between wiper plate portions 141, 143, 145 rigidly secure wiping plate sections 141, 143, 145 together. Threaded fasteners 151 extending through bore openings 153 in brace bars 97, 99, 101, and through slotted openings 155 in wiper plate sections 141, 143, 145 adjustably secure wiping plate 139 for vertical adjustment along trailing edge 103 of strut 53. When processing wet clay material, wiping plate 139 is downwardly adjusted so that it just clears rotating rotor blade edges 37; the bottom edge horizontal wiping surfaces 157, 159, 161 (see FIG. 3) of wiping plate 139 are adjusted closely above cutting edges 37 of rotor blades 19. Wiper plate 139 is adapted to wipe or clear wet clay material from blade cutting edges and to forcibly press the wet clay material through blade openings 35 and into chute 81.

The feed means of machine 11 also preferably includes clay doffing means arranged subjacently of rotor 15 for doffing unwanted clay deposit or buildup from chute 81 and spillage shield 83. First doffing means includes a long plate-like doffing blade 163 (see FIGS. 1, 2 and 5) dependingly fixed at 165 to the underportion of rotor body 17. Doffer blade 163 is longitudinally angularly formed and includes a vertical portion 167 and a main slanted portion 169 having a longitudinally extending leading edge 171. When rotor 15 is rotating, doffing blade 163 rotating therewith, is adapted to move circumferentially around the inside of chute 81; doffer blade leading edge 171 is adapted to brush circumferentially along conical inside surface 89 of chute 81 and remove clay buildup material.

The second clay doffing means is adapted to remove clay material from circumferential downturned flange 87 of spillage shield 83. A stationary doffing bar 173 (see FIGS. 1 and 5) having a leading edge 175 is adapted to scrape or brush clay material buildup from the inside surface of spillage shield flange 87 and the peripheral under portions of rotor body 17. Doffing bar 173 is fixedly secured at 177 (see FIG. 1) to inside surface 89 of stationary chute 81. Doffing bar 173 is radially positioned relative to rotor 15 and to rotating doffer blade 163; the relative arrangement of stationary doffing bar 173 and vertical portion 167 of rotating doffer blade 163 is such that blade 163 barely clears doffing bar 173 as the doffing blade sweeps around the inside of chute 81. The lower tip end 179 of doffing blade 163 preferably extends slightly into output opening 181 of chute 81 and thereby substantially clears the full conical inside surface of the chute.

The means for conveying the clay material into and away from machine 11 will of course be determined by the particular installation of the machine. In certain embodiments it may be desirable to mount the machine on wheels as a mobile unit. In other embodiments it may be desirable to stationarily install the machine at a desired location.

While I have shown and described a preferred embodiment of the present invention it will be understood that various changes in structure may be made without departing from the spirit and scope of the invention as defined in the claims.

I claim:
1. A machine for comminuting chunks of mined clay for further processing comprising generally rigid unitary support structure including a ring structure arranged horizontally and opening vertically, a rotor including a body having a circular planar face facing upwardly and adapted to supportingly receive the clay stock material during the processing thereof, said rotor body being arranged subjacently coaxially of said ring structure, first bearing means supported from said support structure supporting said rotor body against gravity and against downward axial displacement, second bearing means supported from said support structure firmly journaling and supporting said rotor body against horizontal radial displacement, drive means for driving said rotor body, a multiplicity of cutter blades arranged generally circularly and radially about the axis of said rotor body, each cutter blade being fixedly secured in said rotor body and each having a cutting edge arranged slightly above said rotor body planar face and facing the direction of motion of said rotor body, each blade being adapted to cut an underportion from a chunk of clay material being processed and to pass the cut portion through and below said rotor body; and feed means for feeding the clay material into the cutting blade cutting edges and for continuously uniformly feeding the clay material through said rotor body and through said machine, said feed means including stationary crowder means arranged at least along a single radian of said ring structure and at least along a substantial portion of the full length of said radian, and with said crowder means including structure defining at least one vertically obliquely extending stationary crowder surface extending substantially normal to said radian, facing the direction of motion of said rotor, and with the trailing edge portion of said crowder surface, relative to the direction of rotation of said rotor, being spaced substantially close above the planar path of rotation of a respective cutter blade cutting edge; the rotative movement of the cutter blades being adapted to propel the clay chunks wedgingly underneath said crowder means thereby forceably urging the clay against the blade cutting edges and through the rotor body, said feed means additionally including breaker means for breaking the clay into smaller parts including at least a single spaced apart pair of opposingly arranged corresponding generally co-planar stationary breaker edge portions and with said pair of breaker edge portions being fixedly arranged relative to said support structure and arranged intermediately of the length of a radian of said ring structure, said pair of breaker edge portions extending vertically obliquely and substantially normal to the extension of the last-mentioned radian and facing the direction of motion of said rotor, and with the trailing portions of said pair of breaker edge portions being spaced substantially close above the path of rotation of a respective cutting edge, said breaker means including at least one breaker lug, having a blunt leading edge, fixed on and projecting upwardly from the planar face of said rotor and being arranged, relative to the radial extension of said rotor face, at a position for sweeping between said pair of breaker edge portions upon rotation of said rotor body; the action of said breaker means being effective for wedgingly breaking the chunks of clay material between the rotating breaker lug and the stationary pair of breaker edge portions.

2. A machine for comminuting chunks of mined clay for further processing comprising generally rigid unitary support structure including a ring structure arranged horizontally and opening vertically, a rotor including a body having a circular planar face facing upwardly and adapted to supportingly receive the clay stock material, during the processing thereof, said rotor body being arranged subjacently coaxially of said ring structure, first bearing means supported from said support structure supporting said rotor body against gravity and against downward axial displacement, second bearing means supported from said support structure firmly journaling and supporting said rotor body against horizontal radial displacement, drive means for driving said rotor body, a multiplicity of cutter blades arranged generally circularly and radially about the axis of said rotor body, each cutter blade being fixedly secured in said rotor body and each having a cutting edge arranged slightly above said rotor body planar face and facing the direction of motion of said rotor body, each blade being adapted to cut an underportion from a chunk of clay material being processed and to pass the cut portion through and below said rotor body; and feed means for feeding the clay material into the cutting blade cutting edges and for continuously uniformly feeding the clay material through said rotor body and through said machine, said feed means including stationary crowder means arranged at least along a single radian of said ring structure and at least along a substantial portion of the full length of said radian, and with said crowder means including structure defining at least one vertically obliquely extending stationary crowder surface extending substantially normal to said radian, facing the direction of motion of said rotor, and with the trailing edge portion of said crowder surface, relative to the direction of rotation of said rotor, being spaced substantially close above the planar path of rotation of a respective cutter blade cutting edge; the rotative movement of the cutter blades being adapted to propel the clay chunks wedgingly underneath said crowder means thereby forceably urging the clay against the blade cutting edges and through the rotor body, said feed means additionally including breaker means for breaking the clay into smaller parts including at least a single spaced apart pair of opposingly arranged corresponding generally co-planar stationary breaker edge portions and with said pair of breaker edge portions being fixedly arranged relative to said support structure and arranged intermediately of the length of a radian of said ring structure, said pair of breaker edge portions extending vertically obliquely and substantially normal to the extension of the last-mentioned radian and facing the direction of motion of said rotor, and with the trailing portions of said pair of breaker edge portions being spaced substantially close above the path of rotation of a respective cutting edge, said breaker means including at least one breaker lug fixed on and projecting upwardly from the planar face of said rotor and being arranged, relative to the radial extension of said rotor face, at a position for sweeping between said pair of breaker edge portions upon rotation of said rotor body; the action of said breaker means being effective for wedgingly breaking the chunks of clay material between the rotating breaker lug and the stationary pair of breaker edge portions; said ring structure of said support structure including structure defining a circular generally vertical inside surface arranged superjacently and concentrically of said rim portion of said rotor body and said feed means additionally including a breaker-scraper lug fixed on and projecting upwardly from the circular planar face of said rotor body adjacent the rim portion of said rotor body, and said breaker means including, in addition to said pair of breaker edge portions, a single breaker edge portion fixedly arranged relative to said support structure, arranged generally co-planar with said pair of breaker edge portions, and spaced radially inwardly from said inside surface of said ring structure; the space between said ring structure inside surface and said single breaker edge portion defining a gap, said breaker-scraper lug being substantially contiguously arranged relative to said ring structure inside surface and, upon rotation of said rotor body, being adapted to sweep circumferentially along said inside surface and remove buildup clay material from said inside surface, and being adapted to sweep through said gap and wedgingly break clay chunks into smaller parts.

3. A machine according to claim 2 wherein the stationary structure of said crowder means and said breaker means are integrally formed and in which said stationary structure includes crowder-breaker bar means including at least two crowder-breaker bars arranged substantially in end to end spaced apart arrangement, and wherein each said crowder-breaker bar includes structure defining a substantially flat crowder surface and wherein the confronting end portions respectively of said crowder-breaker bars define said pair of breaking edge portions.

4. A machine according to claim 3 wherein said single breaker edge portion is integrally formed with one of the two crowder-breaker bars and arranged on the opposite end of said one bar from that end portion confronting the end portion of the other crowder-breaker bar.

5. A machine for comminuting chunks of mined clay for further processing comprising generally rigid unitary support structure including a ring structure arranged horizontally and opening vertically, a rotor including a body having a circular planar face facing upwardly and adapted to supportingly receive the clay stock material during the processing thereof, said rotor body being arranged subjacently coaxially of said ring structure, first bearing means supported from said support structure supporting said rotor body against gravity and against downward axial displacement, second bearing means supported from said support structure firmly journaling and supporting said rotor body against horizontal radial displacement, drive means for driving said rotor body, a multiplicity of cutter blades arranged generally circularly and radially about the axis of said rotor body, each cutter blade being fixedly secured in said rotor body and each having a cutting edge arranged slightly above said rotor body planar face and facing the direction of motion of said rotor body, each blade being adapted to cut an underportion from a chunk of clay material being processed and to pass the cut portion through and below said rotor body; and feed means for feeding the clay material into the cutting blade cutting edges and for continuously uniformly feeding the clay material through said rotor body and through said machine, said feed means including stationary crowder means arranged at least along a single radian of said ring structure and at least along a substantial portion of the full length of said radian, and with said crowder means including structure defining at least one vertically obliquely extending stationary crowder surface extending normal to said radian, facing the direction of motion of said rotor, and with the trailing edge portion of said crowder surface, relative to the direction of rotation of said rotor, being spaced substantially close above the planar path of rotation of a respective cutter blade cutting edge; the rotative movement of the cutter blades being adapted to propel the clay chunks wedgingly underneath said crowder means thereby forceably urging the clay against the blade cutting edges and through the rotor body, said feed means additionally including breaker means for breaking the clay into smaller parts including at least a single spaced apart pair of opposingly arranged corresponding generally co-planar stationary breaker edge portions and with said pair of breaker edge portions being fixedly arranged relative to said support structure and arranged intermediately of the length of a radian of said ring structure, said pair of breaker edge portions extending vertically obliquely and substantially normal to the extension of the last-mentioned radian and facing the direction of motion of said rotor, and with the trailing portions of said pair of breaker edge portions being spaced substantially close above the path of rotation of a respective cutting edge, said breaker means including at least one breaker lug fixed on and projecting upwardly from the planar face of said rotor and being arranged, relative to the radial extension of said rotor face, at a position for sweeping between said pair of breaker edge portions upon rotation of said rotor body; the action of said breaker means being effective for wedgingly breaking the chunks of clay material between the rotating breaker lug and the stationary pair of breaker edge portions; said feed means additionally including cutter blade cutting edge wiping plate means including structure defining at least one horizontal wiping surface fixedly arranged and closely spaced above the cutting edges of a circularly arranged number of said cutter blades arranged generally concentrically about the axis of said rotor; said wiping blade wiping surface being adapted to wipe or clear wet clay material from the distal cutting edge portions of said cutter blades as the rotor circularly moves the blades under the wiper blade wiping surface.

6. A machine according to claim 2 wherein said second bearing means journaling said rotor body is arranged superjacently of said rotor body and includes a vertical axle shaft fixed on and projecting upwardly from said rotor body, a sleeve-like bearing casing rotatably received concentrically on said shaft, and a plurality of horizontal struts radiatingly arranged about said bearing casing and fixedly secured each at opposite end portions thereof to said bearing casing and said support structure ring structure.

7. A machine according to claim 6 wherein said crowder means and the stationary pair fo breaker edge portions, and said single breaker edge portions are unitarily formed with one of the struts of said second bearing means, and with said strut affording the stationary supporting structure for said crowder means, said pair of breaker edge portions, and said single breaker edge portion.

8. A machine according to claim 7 wherein the remainder of said struts are at heights different from said one of said struts and are angled to provide additional crowder means.

9. A machine for comminuting chunks of mined clay for further processing comprising generally rigid unitary support structure including a ring structure arranged horizontally and opening vertically, a rotor including a body having a circular planar face facing upwardly and adapted to supportingly receive the clay stock material during the processing thereof, said rotor body being arranged subjacently coaxially of said ring structure, first bearing means supported from said support structure supporting said rotor body against gravity and against downward axial displacement, second bearing means supported from said support structure firmly journaling and supporting said rotor body against horizontal radial displacement, drive means for driving said rotor body, a multiplicity of cutter blades arranged generally circularly and radially about the axis of said rotor body, each cutter blade being fixedly secured in said rotor body and each having a cutting edge arranged slightly above said rotor body planar face and facing the direction of motion of said rotor body, each blade being adapted to cut an underportion from a chunk of clay material being processed and to pass the cut portion through and below said rotor body; and feed means for feeding the clay material into the cutting blade cutting edges and for continuously uniformly feeding the clay material through said rotor body and through said machine, said feed means including stationary crowder means arranged at least along a single radian of said ring structure and at least along a substantial portion of the full length of said radian, and with said crowder means including structure defining at least one vertically obliquely extending stationary crowder surface extending substantially normal to said radian, facing the direction of motion of said rotor, and with the trailing edge portion of said crowder surface, relative to the direction of rotation of said rotor, being spaced substantially close above the planar path of rotation of a respective cutter blade cutting edge; the rotative movement of the cutter blade being adapted to propel the clay chunks wedgingly underneath said crowder means thereby forceably urging the clay against the blade cutting edges and through the rotor body, said feed means additionally including breaker means for breaking the clay into smaller parts including at least a single spaced apart pair of opposingly arranged corresponding generally co-planar stationary breaker edge portions and with said pair of breaker edge portions being fixedly arranged relative to said support structure and arranged intermediately of the length of a radian of said ring structure, said pair of breaker edge portions extending vertically obliquely and substantially normal to the extension of the last-mentioned radian and facing the direction of motion of said rotor, and with the trailing portions of said pair of breaker edge portions being spaced substantially close above the path of rotation of a respective cutting edge, said breaker means including at least one breaker lug fixed on and projecting upwardly from the planar face of said rotor and being arranged, relative to the radial extension of said rotor face, at a position for sweeping between said pair of breaker edge portions upon rotation of said rotor body; the action of said breaker means being effective for wedgingly breaking the chunks of clay material between the rotating breaker lug and the stationary pair of breaker edge portions; additionally including a stationary funnel-shaped conical chute having a circular upper rim concentrically arranged subjacently of said rotor body and said rotor body additionally including a spillage shield arranged circumfertially over the circular upper rim of said chute and said spillage shield including internal downturned flange structure extending circumferentially along the circular inside surface of said circular rim, and said feed means additonally including first clay doffing means adapted for removing clay material buildup from the inside surface of the lateral wall of said conical chute, and including a downwardly depending doffer blade fixedly secured to the underportion of said rotor body and rotatable therewith, said doffer blade having a leading edge arranged parallel and contiguous said inside surface of said stationary chute; and includes second clay doffing means adapted for removing clay material buildup from the circumferential downturned flange structure of said spillage shield, and wherein said second doffing means includes a doffer bar having a leading edge, and includes means fixedly mounting said doffer bar from said chute with said leading edge being contiguous said downturned flange structure of said spillage shield; the rotating spillage shield flange structure being adapted to continuously brush past the stationary doffer bar and to doff clay material buildup from the spillage shield flange structure.

10. A machine for comminuting chunks of mined clay stock for further processing comprising rigid unitary support structure including horizontal ring structure opening vertically, a rotor including a body having a circular planar face facing upwardly, bearing means firmly journalling said rotor concentrically subjacently of said ring structure, a multiplicity of cutting blades arranged generally circularly and radially about the axis of said rotor, each blade having a cutting edge arranged slightly above said rotor body, crowder-breaker means including at least two crowder-breaker bars arranged in spaced apart end-to-end arrangement, said crowder-breaker means including obliquely arranged means for wedgingly holding the chunks of clay and including means stationarily securing said pair of crowder-breaker bars substantially horizontally and along a radian of said ring structure and substantially in closely spaced relationship with the planar face of said rotor body, said crowder-breaker means including at least one breaker lug, having a blunt leading face, fixed on and projecting upwardly from the planar face of said rotor and being arranged at a position on said rotor face for sweeping between the confronting end portions of said two crowder-breaker bars to break up the chunks of clay.

References Cited

UNITED STATES PATENTS

| 134,233 | 12/1872 | Wilder | 241—92 X |
| 453,398 | 6/1891 | Holbrook | 241—92 |
| 956,130 | 4/1910 | Misner. | |
| 1,024,262 | 4/1912 | Jacquart | 241—92 X |
| 1,802,203 | 4/1931 | Dosch. | |

ROBERT C. RIORDON, Primary Examiner

D. G. KELLY, Assistant Examiner

U.S. Cl. X.R.

241—167, 220